United States Patent
Wang

(10) Patent No.: US 12,405,407 B2
(45) Date of Patent: Sep. 2, 2025

(54) DRIVING MECHANISM

(71) Applicant: TDK TAIWAN CORP., Taoyuan (TW)

(72) Inventor: Chao-Hsi Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 768 days.

(21) Appl. No.: 17/722,497

(22) Filed: Apr. 18, 2022

(65) Prior Publication Data
US 2022/0334294 A1 Oct. 20, 2022

Related U.S. Application Data

(60) Provisional application No. 63/175,638, filed on Apr. 16, 2021.

(51) Int. Cl.
*G02B 26/02* (2006.01)
*G02B 5/00* (2006.01)

(52) U.S. Cl.
CPC .................................. *G02B 5/005* (2013.01)

(58) Field of Classification Search
CPC ............. G02B 5/005; G02B 7/00; G03B 9/08
See application file for complete search history.

(56) References Cited

U.S. PATENT DOCUMENTS

2022/0091478 A1* 3/2022 Sawanobori ......... G03B 11/043

FOREIGN PATENT DOCUMENTS

CN 211878277 U 11/2020

OTHER PUBLICATIONS

A Search Report in corresponding CN Application No. 202210398233.6 mailed May 28, 2025 is attached, 4 pages.

* cited by examiner

*Primary Examiner* — Euncha P Cherry
(74) *Attorney, Agent, or Firm* — MUNCY, GEISSLER, OLDS & LOWE, P.C.

(57) ABSTRACT

A driving mechanism is provided, including a base, a movable unit, and a movable part. The movable unit is movably disposed on the base and connected to an optical element. The movable part is movably disposed on the base and forms a passage. When the movable part moves from a first position to a second position relative to the base, the movable unit slides through the passage from an initial position to a limit position relative to the base.

10 Claims, 20 Drawing Sheets

DRIVING MECHANISM

CROSS REFERENCE TO RELATED APPLICATIONS

This application claims the benefit of U.S. Provisional Application No. 63/175,638, filed Apr. 16, 2021, the entirety of which is incorporated by reference herein.

BACKGROUND OF THE INVENTION

Field of the Invention

The present invention relates to a driving mechanism, and, in particular, to a driving mechanism that drives an optical element to move.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, to reduce the size of the shutter or aperture mechanism in a camera module can be difficult. Therefore, addressing the aforementioned problems has become a challenge.

BRIEF SUMMARY OF THE INVENTION

An embodiment of the present invention provides a driving mechanism for moving an optical element, including a base, a movable unit, a movable part, a first driving assembly, and a second driving assembly. The movable unit is movably disposed on the base and connected to the optical element. The movable part is movably disposed on the base and having a passage. The first driving assembly is configured to drive the movable part to move relative to the base. The second driving assembly is configured to drive the movable unit to move relative to the base.

When the movable part is driven by the first driving assembly to move relative to the base from a first position to a second position, the movable unit is driven by the second driving assembly to move relative to the base from an initial position through the passage to a limit position.

In some embodiments, the movable part further has a main body and a plurality of blocks protruding from the main body, and the passage is formed between the blocks.

In some embodiments, the movable unit has a sliding portion, and when the movable part is in the first position relative to the base, one of the block stops the sliding portion from entering the passage.

In some embodiments, the movable part forms a curved outer surface, and the sliding portion forms a curved surface shaped corresponding to the curved outer surface of the movable part.

In some embodiments, the base has a fan-shaped recess, and the movable part further has a restricting portion protruding from the main body in a horizontal direction, wherein when the movable part is in the first position relative to the base, the restricting portion abuts a first sidewall of the fan-shaped recess, and when the movable part is in the second position relative to the base, the restricting portion abuts a second sidewall of the fan-shaped recess.

In some embodiments, each of the blocks forms a first guiding surface, and the first guiding surfaces of the blocks form a first divergent structure toward the peripheral of the movable part.

In some embodiments, each of the blocks further forms a second guiding surface, and the second guiding surfaces of the blocks form a second divergent structure toward the peripheral of the movable part, wherein the first guiding surfaces are closer to the restricting portion than the second guiding surfaces.

In some embodiments, the driving mechanism further includes a first buffer member and a second buffer member, wherein the movable unit contacts the first buffer member when in the initial position, and the movable unit contacts the second buffer member when in the limit position.

In some embodiments, the second buffer member is located between the optical element and the first driving assembly in a vertical direction.

In some embodiments, the second buffer member is lower than the first buffer member in the vertical direction.

In some embodiments, the movable part comprises ferromagnetic or magnetic permeable material.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
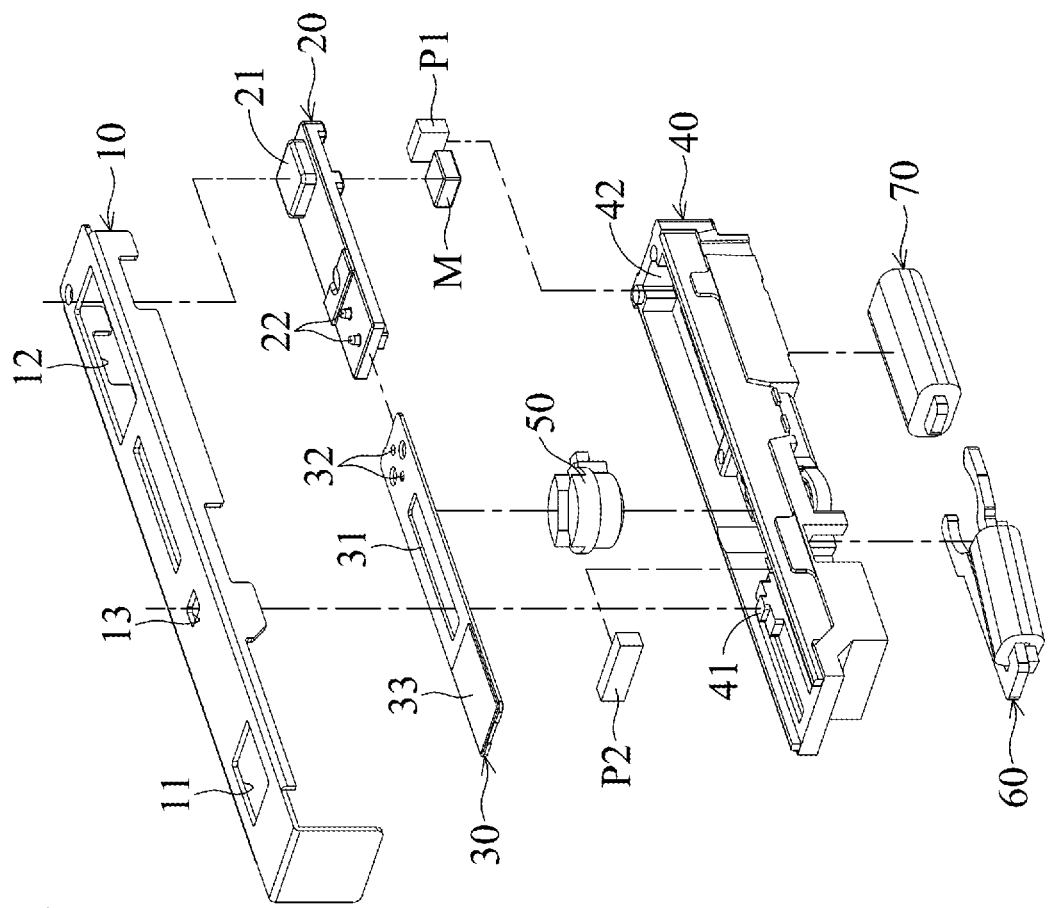
FIGS. 1 and 2 are exploded diagrams of a driving mechanism 100, in accordance with an embodiment of the invention.
Figure 2:
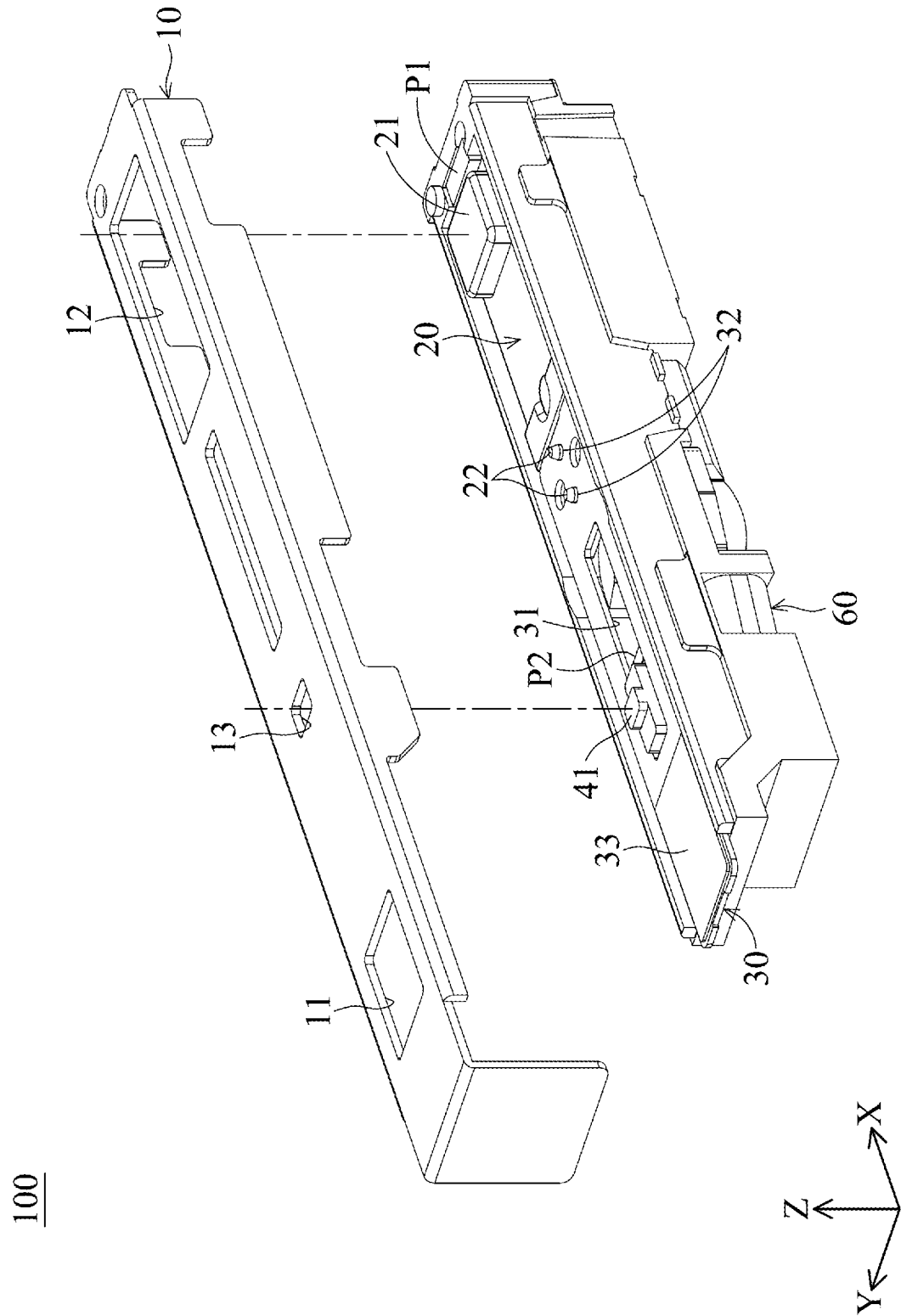
Figure 3:
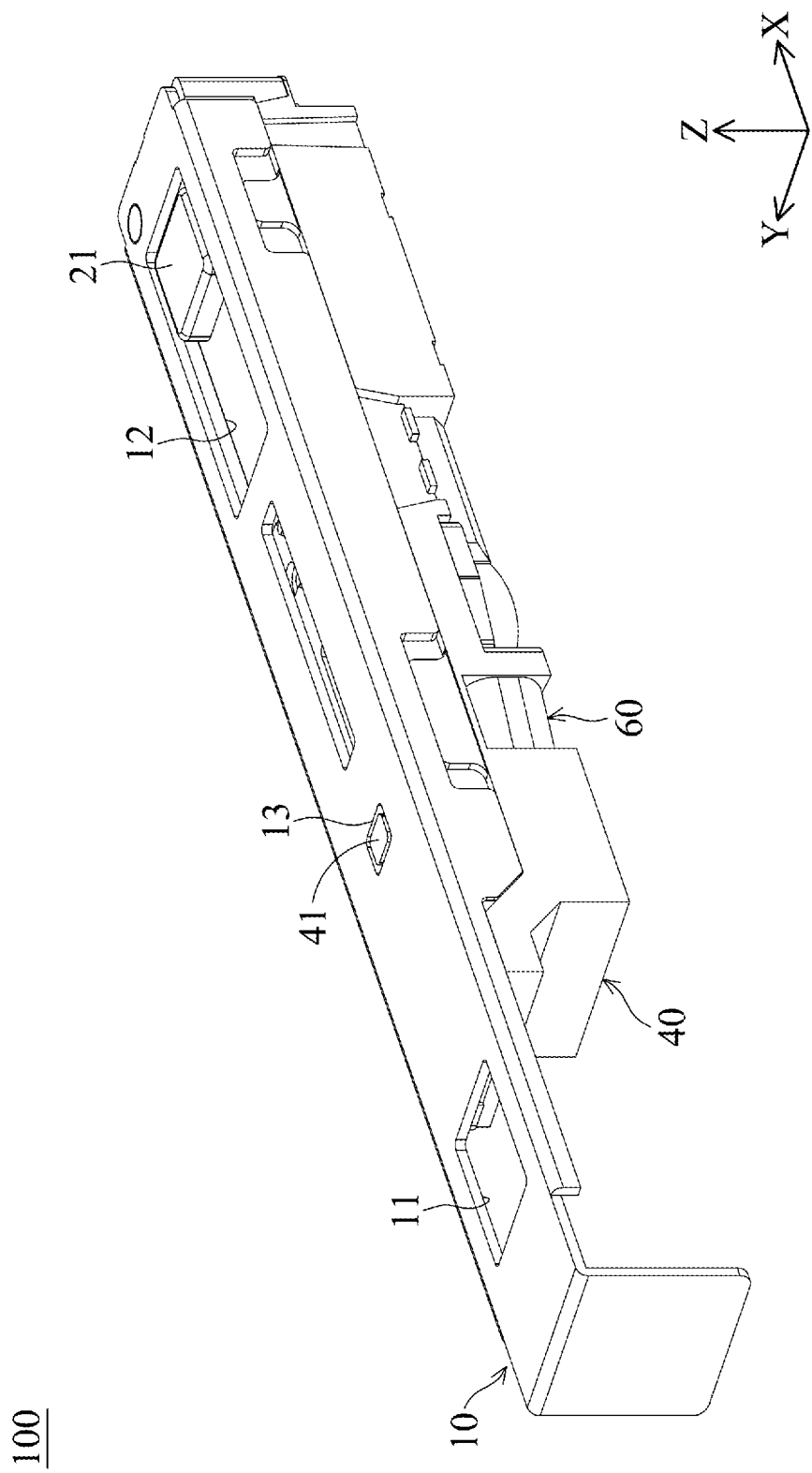
FIGS. 3 and 4 are perspective diagrams of the driving mechanism 100 in FIGS. 1 and 2 after assembly.
Figure 4:
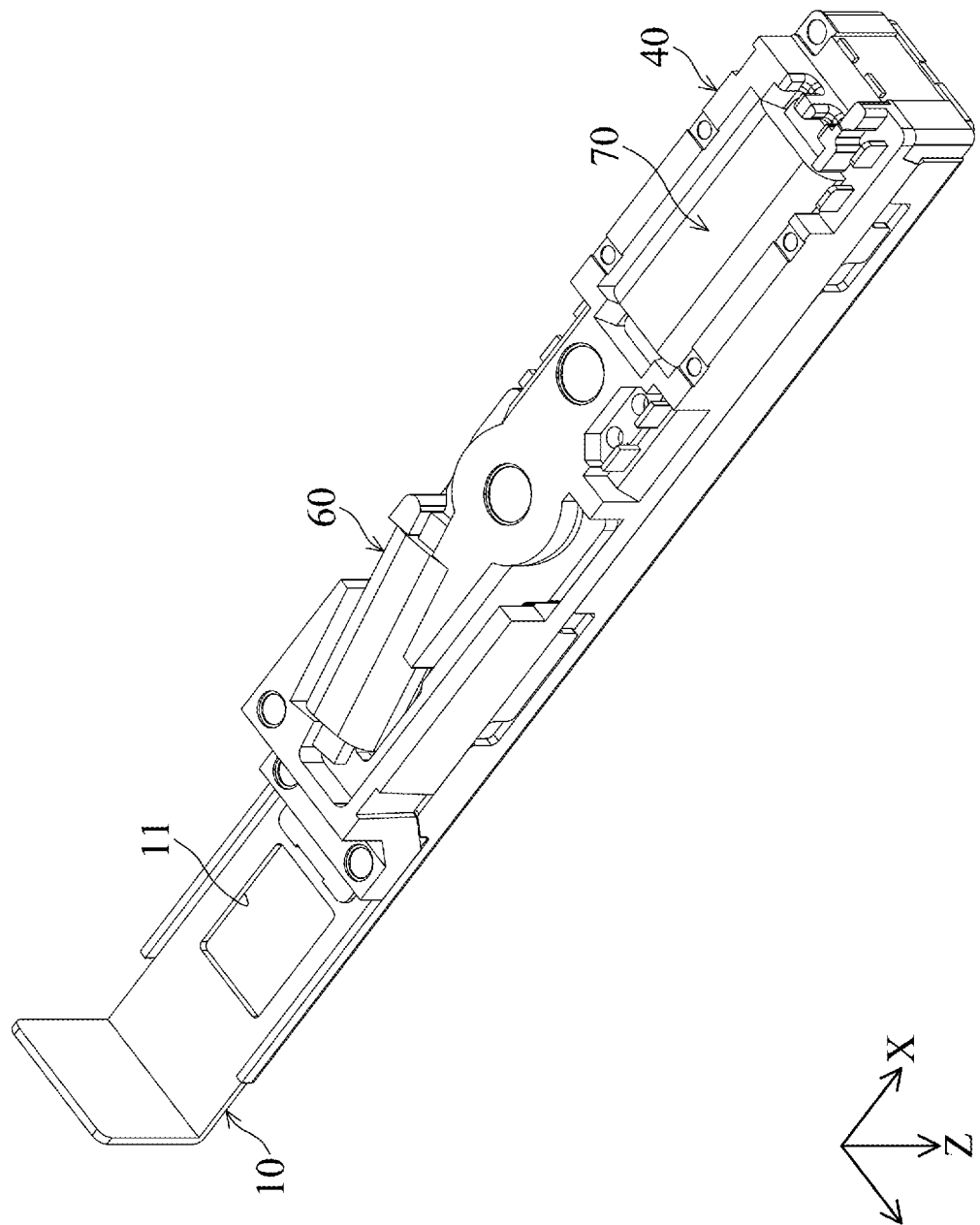
Figure 5:
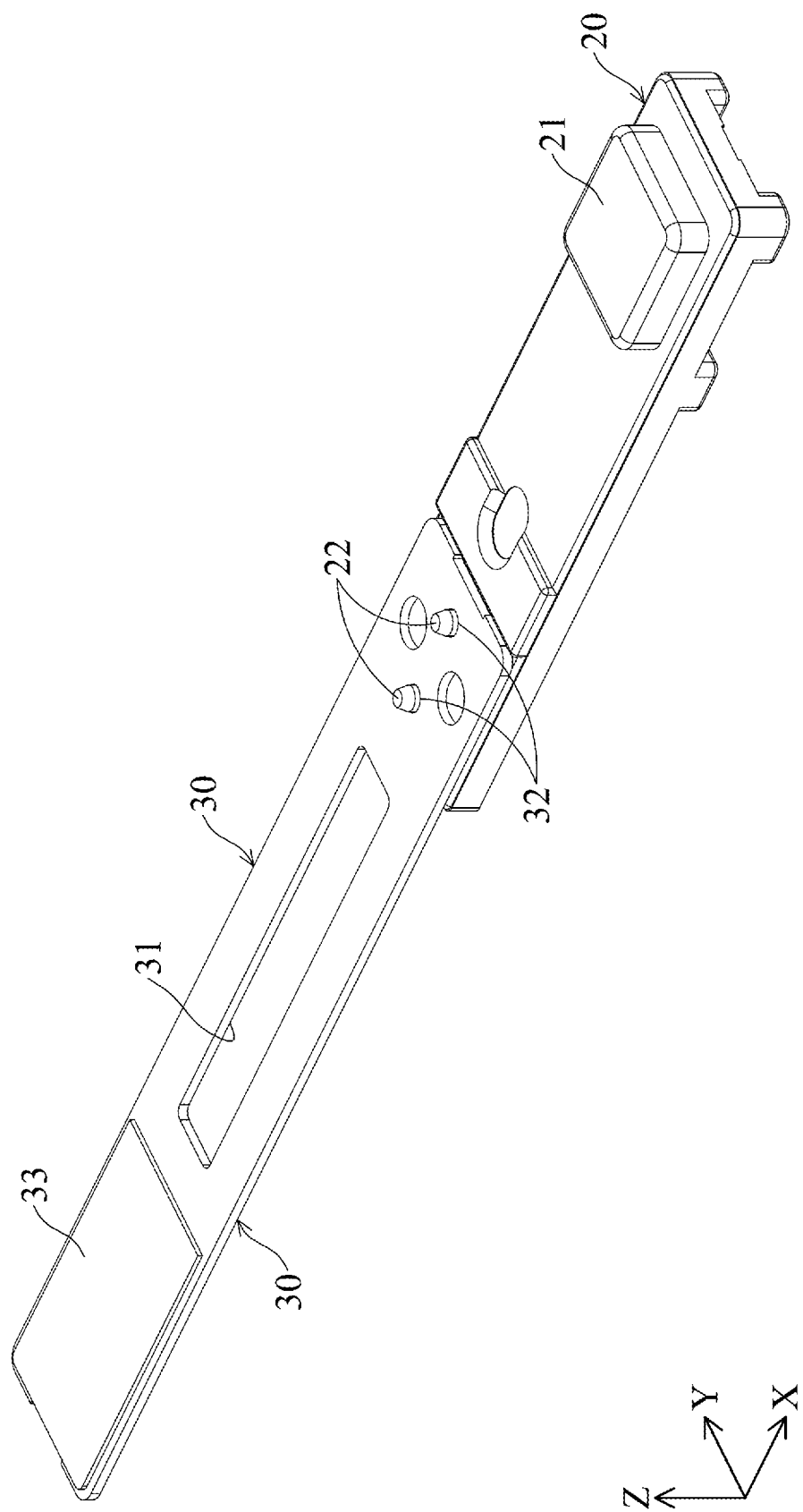
FIGS. 5 and 6 are perspective diagrams of the movable unit 20 and the optical element 30 connected to each other.
Figure 6:
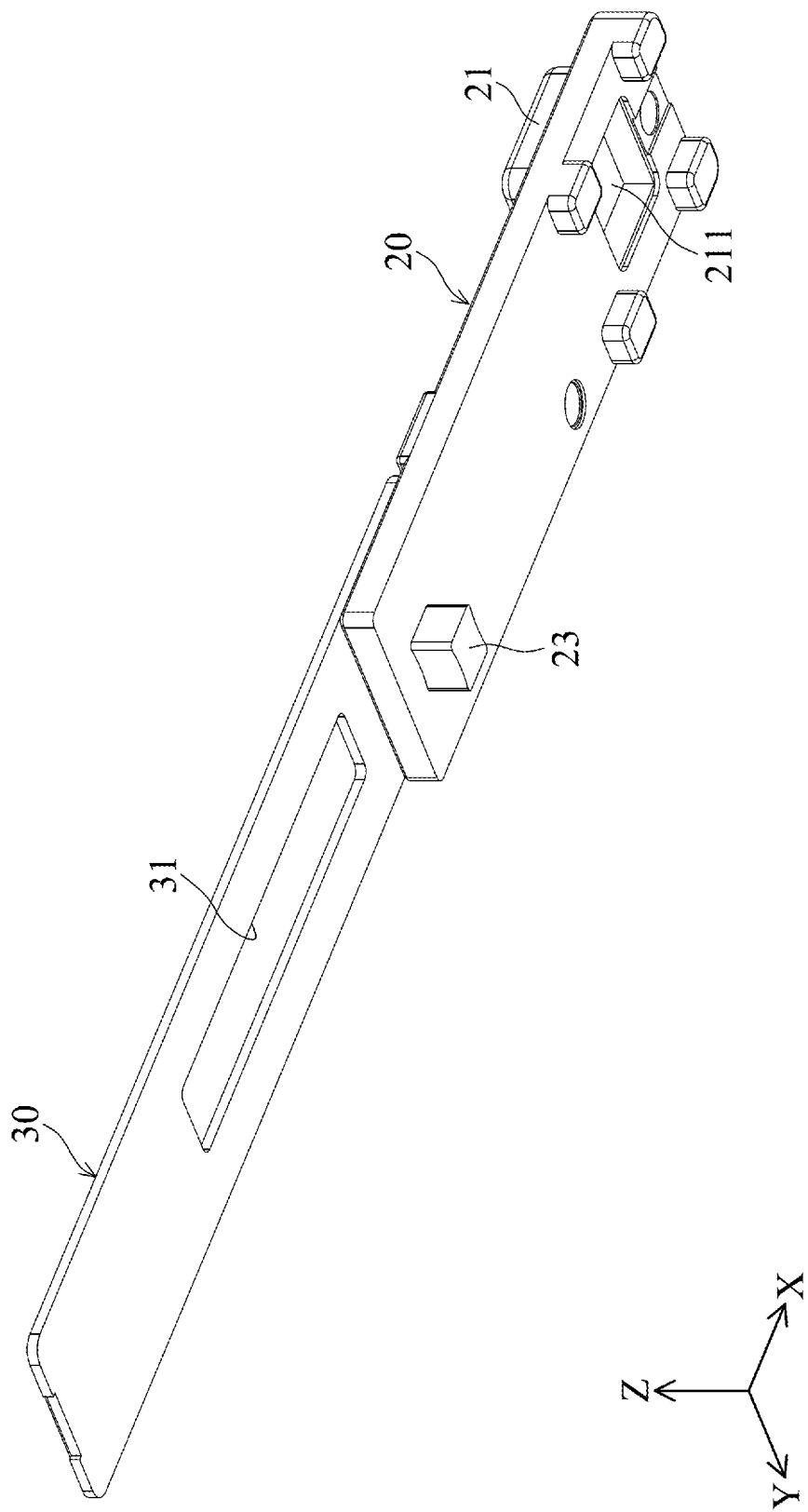
Figure 7:
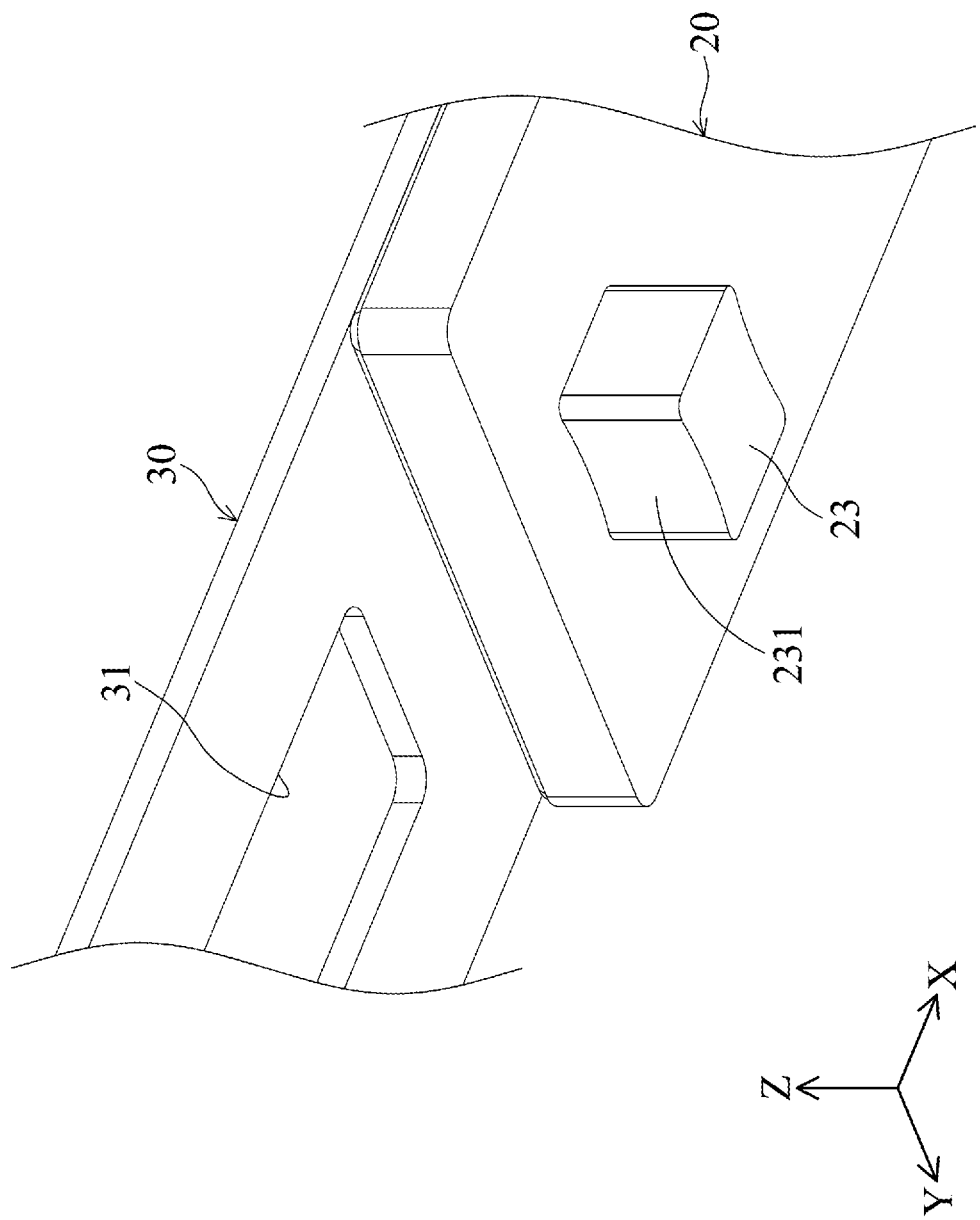
FIG. 7 is a perspective diagram showing the sliding portion 23 of the movable unit 20 that forms a curved surface 231.

FIGS. 1 and 2 are exploded diagrams of a driving mechanism 100, in accordance with an embodiment of the invention. FIGS. 3 and 4 are perspective diagrams of the driving mechanism 100 in FIGS. 1 and 2 after assembly. FIGS. 5 and 6 are perspective diagrams of the movable unit 20 and the optical element 30 connected to each other. FIG. 7 is a perspective diagram showing the sliding portion 23 of the movable unit 20 that forms a curved surface 231.

Referring to FIGS. 1-7, an embodiment of the driving mechanism 100 may be disposed in a cell phone, laptop computer, or other electronic devices. The driving mechanism 100 primarily comprises a housing 10, a movable unit 20, an optical element 30, a base 40, a movable part 50, a first driving assembly 60, a second driving assembly 70, a magnet M, a first buffer member P1, and a second buffer member P2.

It should be noted that the movable part 50 may comprise ferromagnetic or magnetic permeable material, and it is movably disposed in the base 40. The housing 10 forms three openings 11, 12, and 13, and the movable unit 20 has a protrusion 21 and at least a joining portion 22. The optical element 30 has a slot 31, at least a hole 32, and a light-shading portion 33. Here, the movable unit 20 and the optical element 30 are connected to each other by the joining portions 22 joined in the holes 32.

The base 40 forms a nub 41 and a recess 42, wherein the first buffer member P1 is disposed in the recess 42, and the nub 41 penetrates the slot 31 and joined in the opening 13 of the housing 10, whereby the housing 10 is affixed to the base 40. Additionally, the protrusion 21 of the movable unit 20 is received in the opening 12 of the housing 10 and exposed to the top side of the driving mechanism 100.

When the movable unit 20 and the optical element 30 are in an initial position relative to the base 40, as shown in FIG. 3, an end of the movable unit 20 contacts the first buffer member P1. However, when the movable unit 20 and the optical element 30 slide from the initial position along the -X direction to a limit position relative to the base 40, the opening 11 of the housing 10 is blocked by the light-shading portion 33 of the optical element 30, thus preventing light from entering the driving mechanism 100 via the opening 11.

In some embodiments, the light-shading portion 33 may be used as a camera shutter blade. As the light-shading portion 33 comprises light shading material, light can be prevented from entering the driving mechanism 100 to an image sensor (not shown) in the electronic device.

Moreover, as shown in FIGS. 6 and 7, a recess 211 and a sliding portion 23 are formed at the bottom of the movable unit 20. The recess 211 of the movable unit 20 is configured to receive the magnet M (FIG. 1), and the sliding portion 23 forms a curved surface 231 that is shaped corresponding to the curved outer surface of the cylindrical movable part 50.

FIGS. 1-4 further show that the first and second driving assemblies 60 and 70 are disposed at the bottom of the base 40. The first driving assembly 60 can generate a magnetic field to drive the movable part 50 to rotate relative to the base 40. Similarly, the second driving assembly 70 can generate a magnetic field to drive the magnet M, the movable unit 20, and the optical element 30 to move relative to the base 40 along the X axis.

Figure 8:
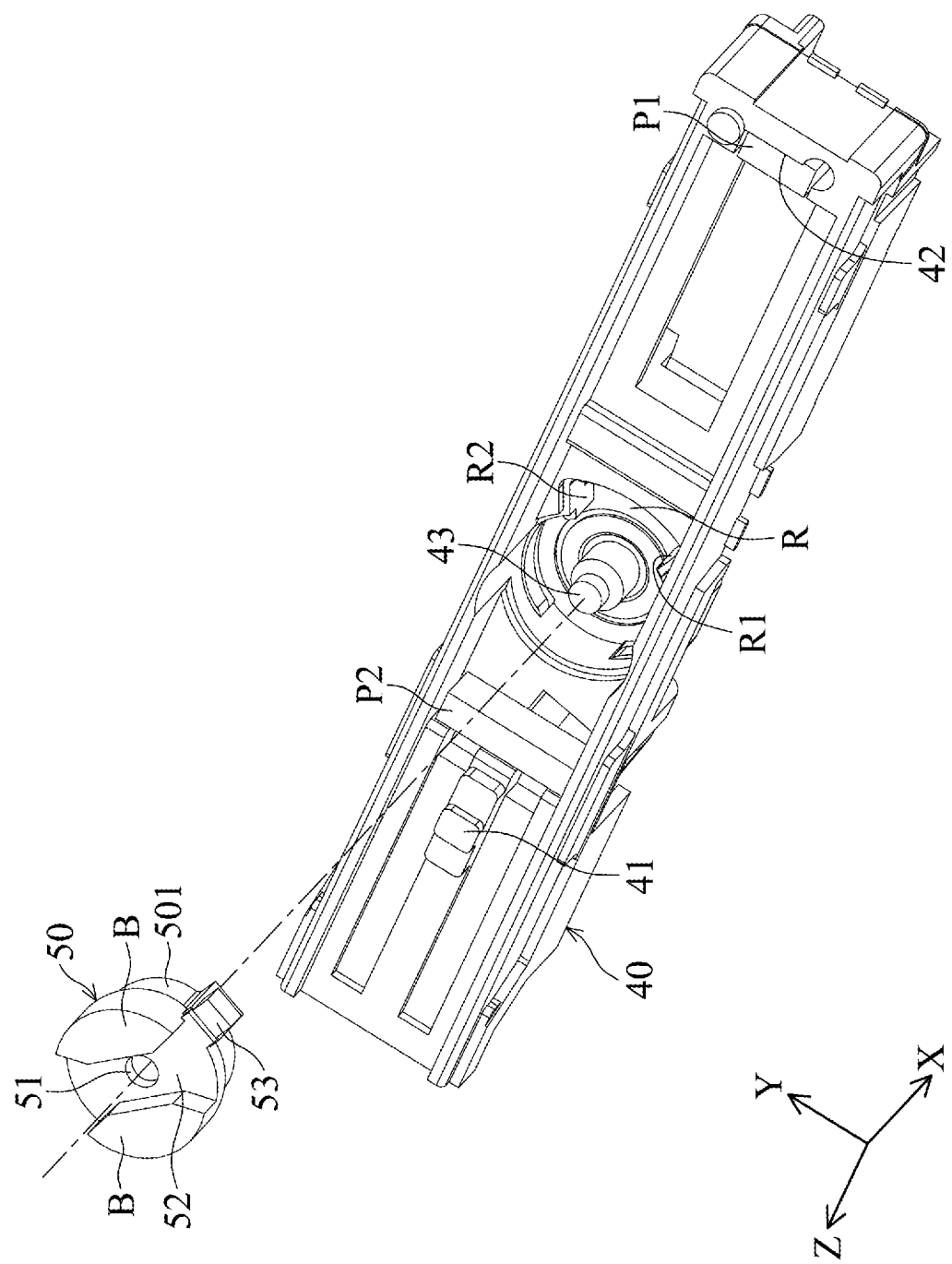
FIG. 8 is an exploded diagram of the movable part 50 and the base 40 before assembly.
Figure 9:
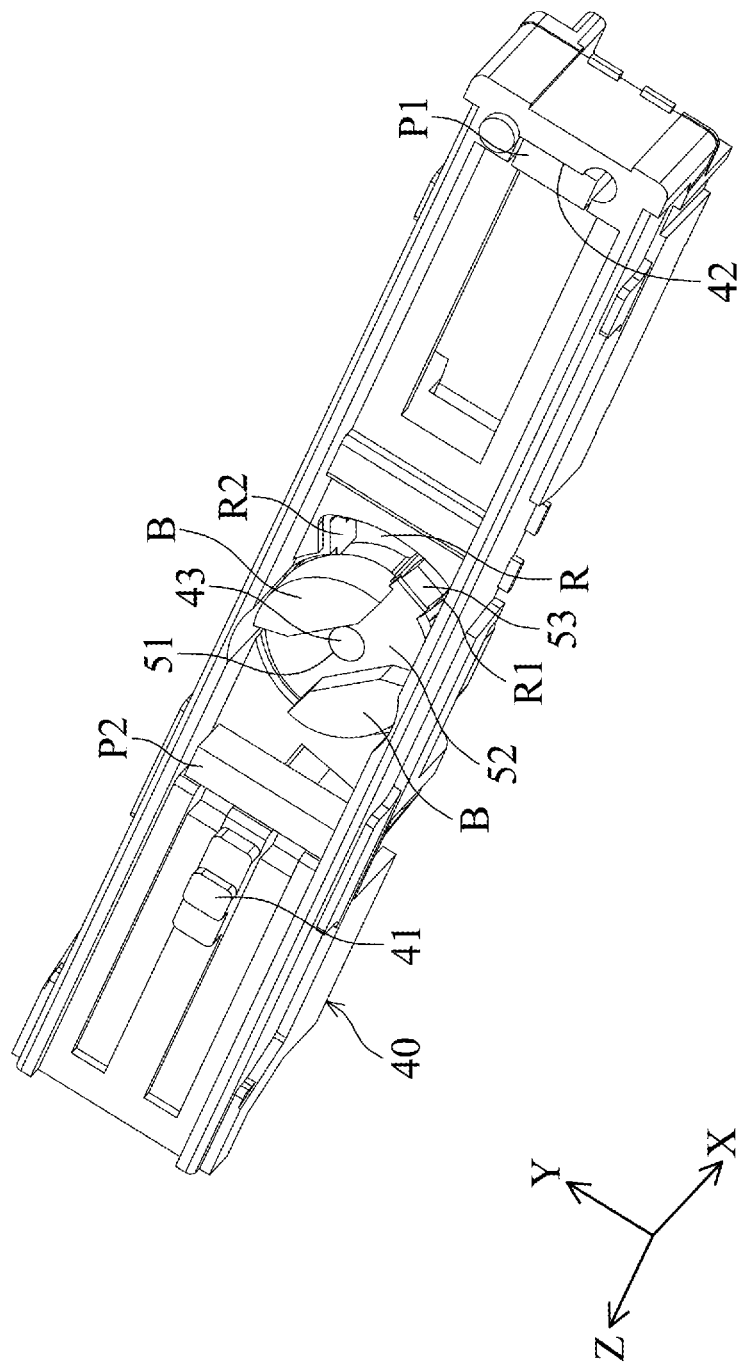
FIG. 9 is a perspective diagram of the movable part 50 and the base 40 after assembly.

FIG. 8 is an exploded diagram of the movable part 50 and the base 40 before assembly. FIG. 9 is a perspective diagram of the movable part 50 and the base 40 after assembly.

As shown in FIGS. 8 and 9, the movable part 50 has a main body 501, a hole 51, two blocks B, a passage 52, and a restricting portion 53. The blocks B protrude from the main body 501 in a vertical direction (Z direction), the passage 52 is formed between the two blocks B, and the restricting portion 53 protrudes from the main body 501 in a horizontal direction that is perpendicular to the Z axis.

During assembly, a hinge 43 of the base 40 is inserted into the hole 51 of the movable part 50, and the restricting portion 53 is movably received in a fan-shaped recess R of the base 40. When the first driving assembly 60 generates a first magnetic field, the restricting portion 53 abuts a first sidewall R1 of the fan-shaped recess R, and the movable part 50 is in a first position relative to the base 40. In this state, the passage 52 between the two blocks B is angled relative to a longitudinal axis (X axis) of the driving mechanism 100. Moreover, as shown in FIG. 8, the second buffer member P2 is disposed in the base 40 and located between the nub 41 and the movable part 50 along the X axis.

Figure 10:
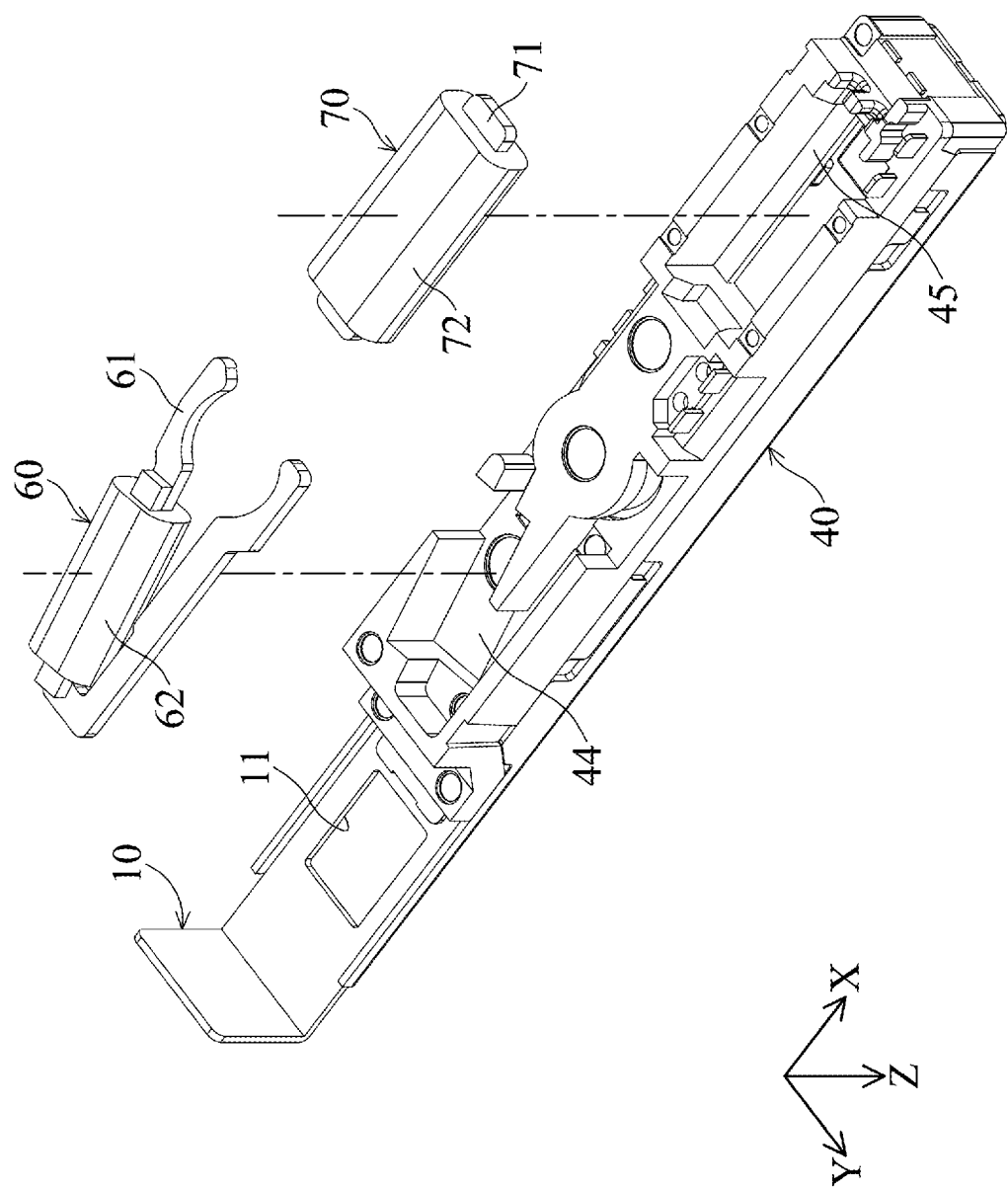
FIG. 10 is an exploded diagram showing the base 40 and the first and second driving assemblies 60 and 70 before assembly.

FIG. 10 is an exploded diagram showing the base 40 and the first and second driving assemblies 60 and 70 before assembly.

As shown in FIG. 10, the first and second driving assemblies 60 and 70 are received in the recesses 44 and 45 of the base 40. The first driving assembly 60 has a yoke 61 and a coil 62, and the second driving assembly 70 has a yoke 71 and a coil 72, wherein the yokes 61 and 71 extend through the coils 62 and 72.

Figure 11:
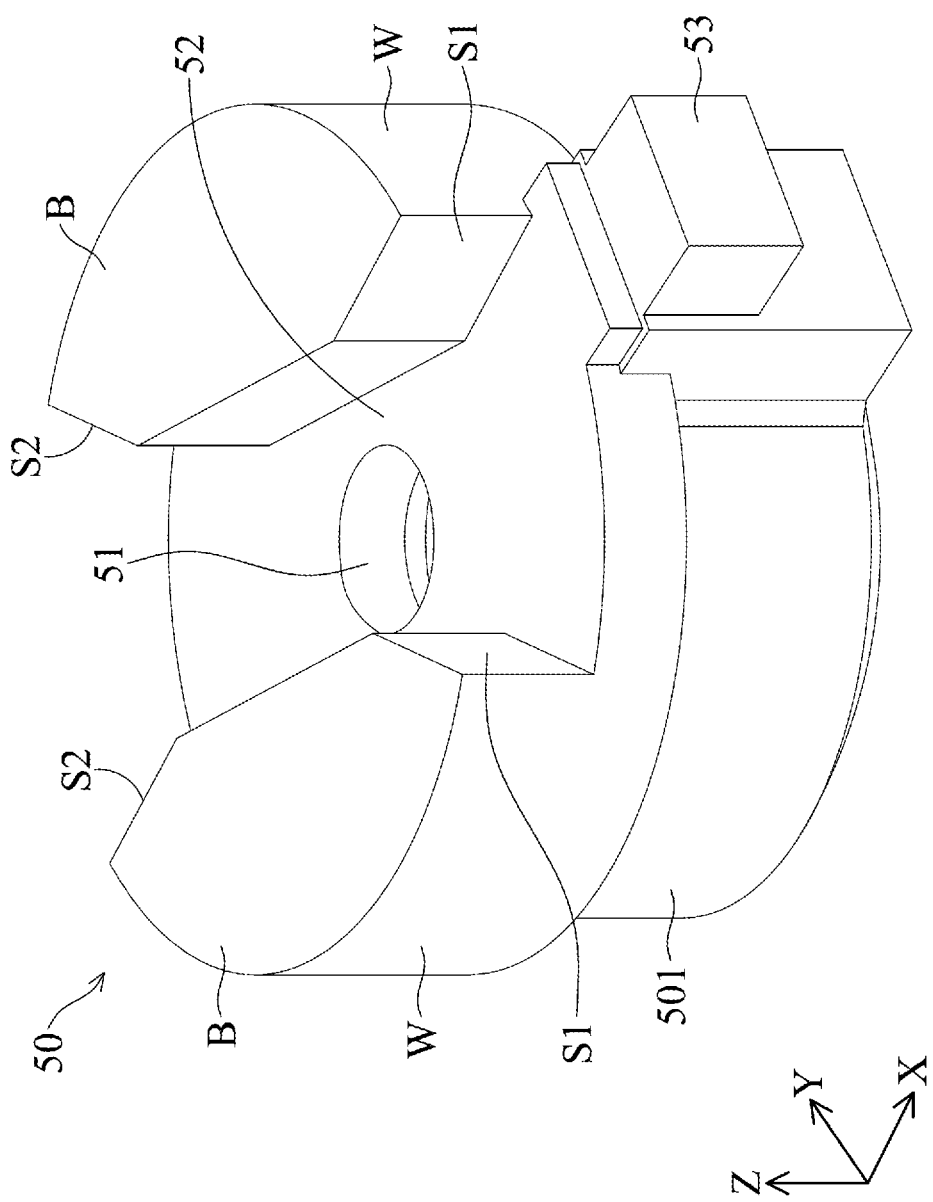
FIG. 11 is a perspective diagram of the movable part 50.
Figure 12:
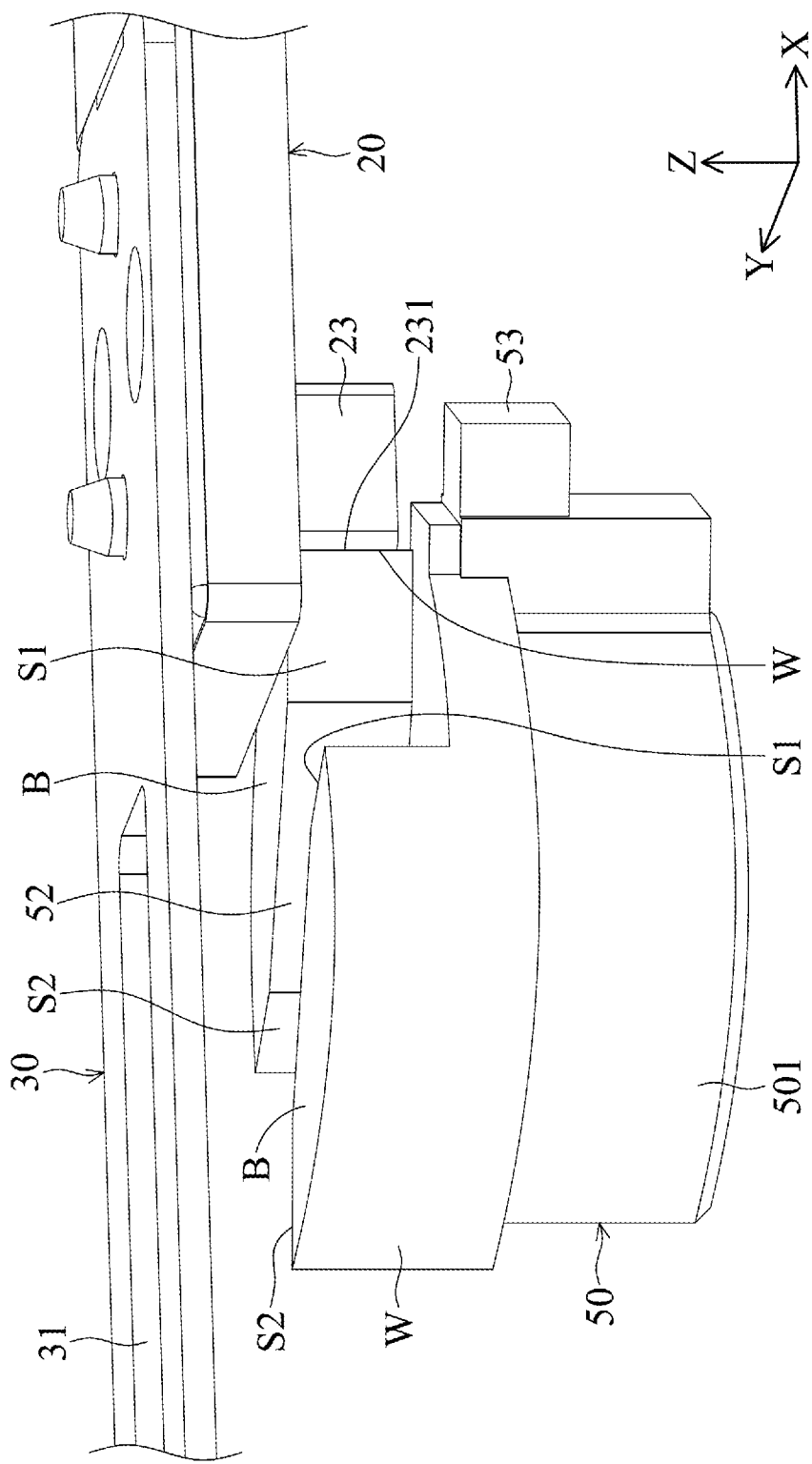
FIG. 12 is a perspective diagram showing the sliding portion 23 of the movable unit 20 when in contact with the outer surface W of the movable part 50.
Figure 13:
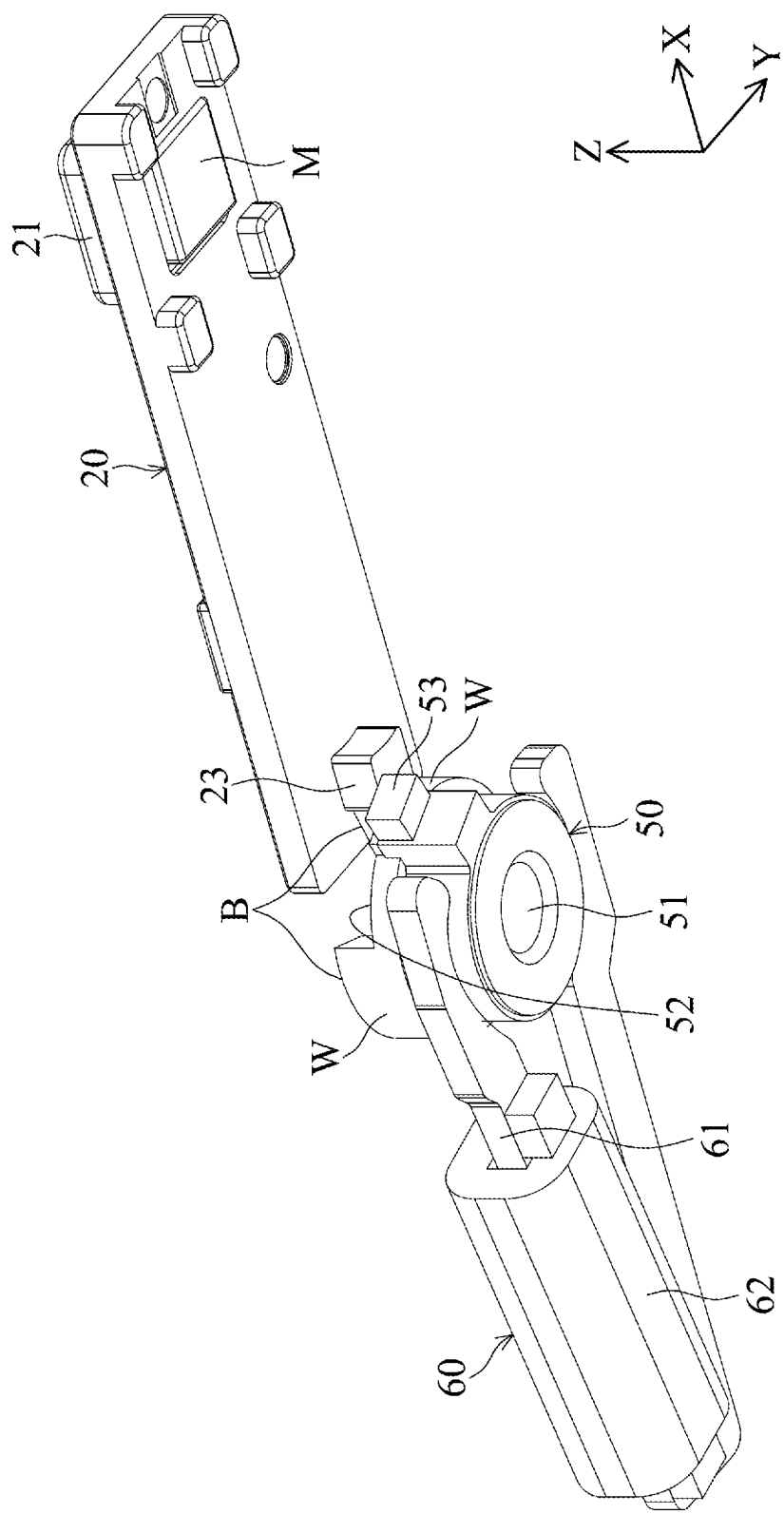
FIG. 13 is a perspective diagram of the movable unit 20, the movable part 50, and the first driving assembly 60 when the first driving assembly 60 generates a first magnetic field.
Figure 14:
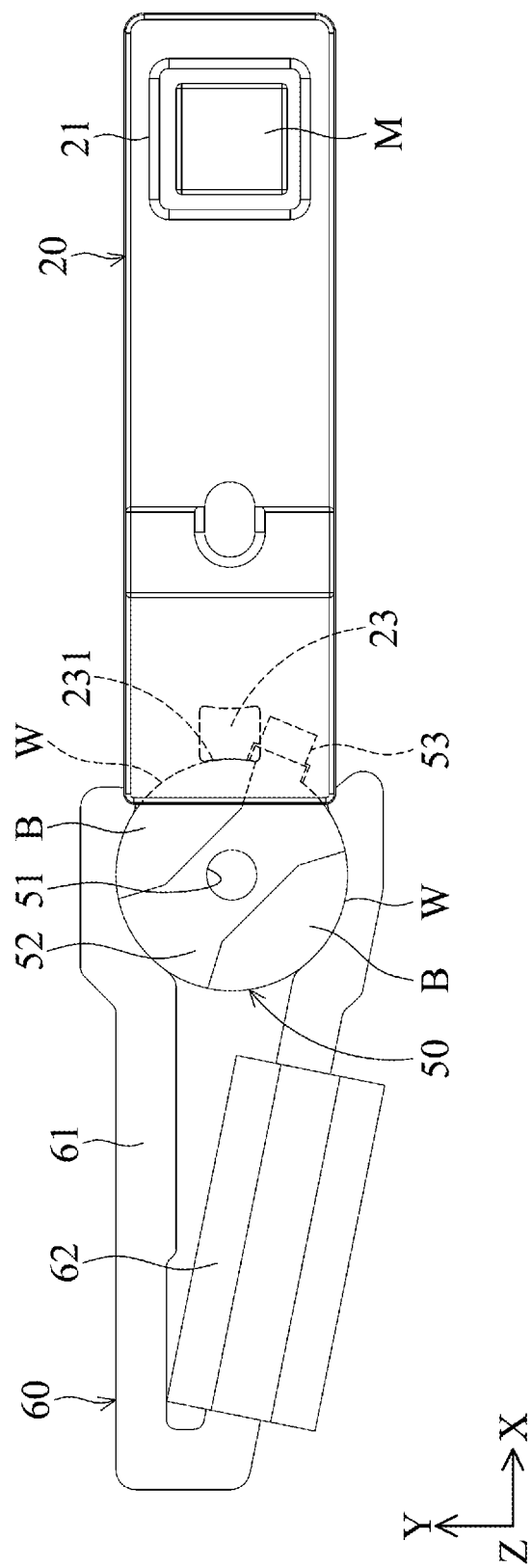
FIG. 14 is a top view of the movable unit 20, the movable part 50, and the first driving assembly 60 when the first driving assembly 60 generates a first magnetic field.
Figure 15:
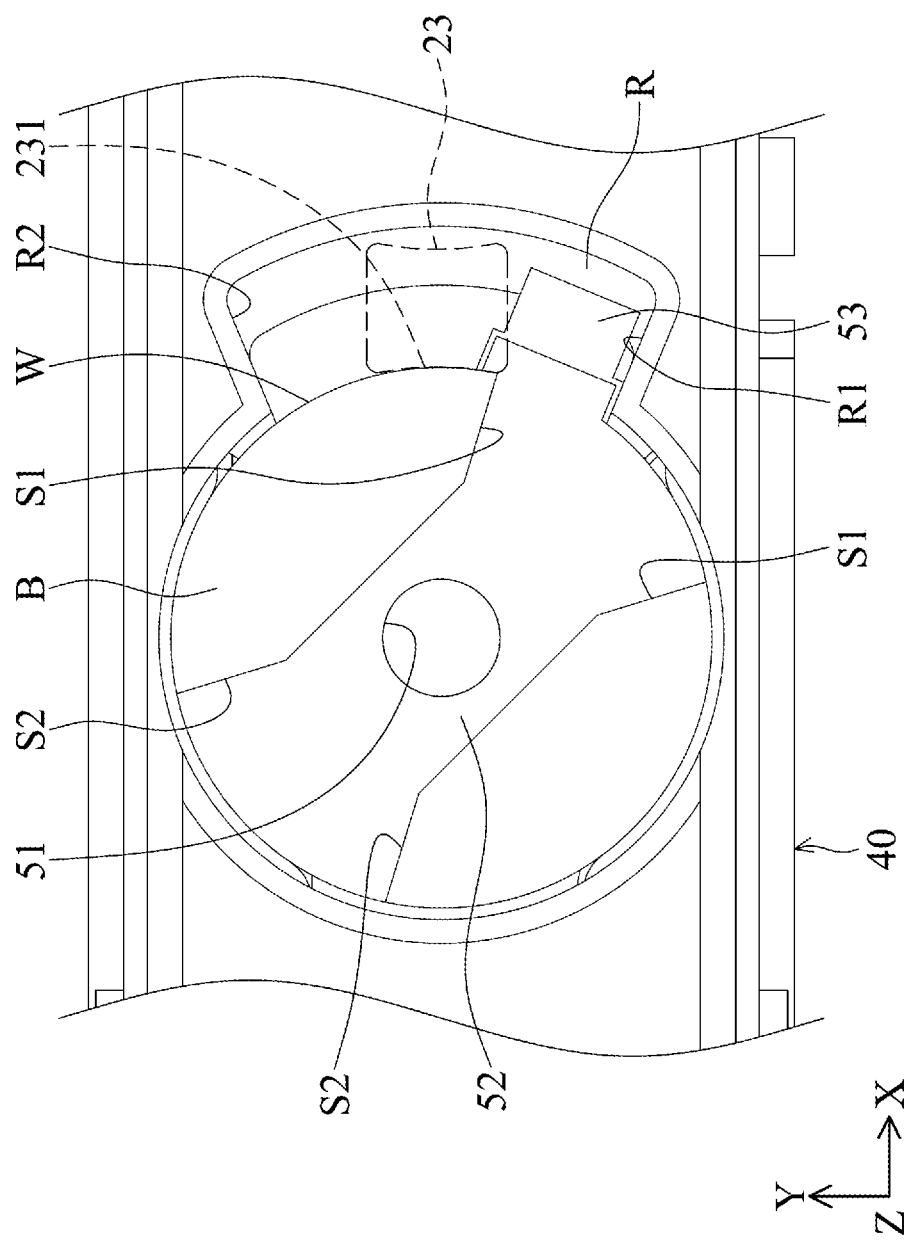
FIG. 15 is a schematic diagram showing the restricting portion 53 of the movable part 50 abutting the first sidewall R1 of the fan-shaped recess R when the first driving assembly 60 generates a first magnetic field.

FIG. 11 is a perspective diagram of the movable part 50. FIG. 12 is a perspective diagram showing the sliding portion 23 of the movable unit 20 when in contact with the outer surface W of the movable part 50. FIG. 13 is a perspective diagram of the movable unit 20, the movable part 50, and the first driving assembly 60 when the first driving assembly 60 generates a first magnetic field. FIG. 14 is a top view of the movable unit 20, the movable part 50, and the first driving assembly 60 when the first driving assembly 60 generates a first magnetic field. FIG. 15 is a schematic diagram showing the restricting portion 53 of the movable part 50 abutting the first sidewall R1 of the fan-shaped recess R when the first driving assembly 60 generates a first magnetic field.

As shown in FIG. 11, each of the blocks B on the top side of the movable part 50 forms a first guiding surface S1 and a second guiding surface S2, wherein the first guiding surfaces S1 of the two blocks B form a first divergent structure toward the peripheral of the movable part 50. Similarly, the second guiding surfaces S2 of the two blocks B form a second divergent structure toward the peripheral of the movable part 50, wherein the first and second divergent structures are on opposite sides of the movable part 50. Thus, the sliding portion 23 at the bottom of the movable unit 20 can be guided through the passage 52 smoothly, and serious collision between the movable unit 20 and the movable part 50 can be efficiently prevented.

In this embodiment, the first and second guiding surfaces S1 and S2 may be slope surfaces or curved surfaces, and the first guiding surfaces S1 are closer to the restricting portion 53 than the second guiding surfaces S2.

Specifically, when a first current signal is applied to the coil 62, the first driving assembly 60 can generate a first magnetic field, wherein the movable part 50 is affected by the first magnetic field and positioned as shown in FIGS. 9 and 13-15. In this state, the restricting portion 53 of the movable part 50 abuts a first sidewall R1 of the fan-shaped recess R, and the passage 52 between the two blocks B is angled relative to a longitudinal axis (X axis) of the driving mechanism 100.

With the passage 52 angled relative to the X axis of the driving mechanism 100, if the second driving assembly 70 and the magnet M generate a magnetic repulsion force impelling the movable unit 20 and the optical element 30 from the initial position of FIGS. 2 and 3 along the –X direction, the sliding portion 23 of the movable unit 20 can be stopped by the outer surface W of the blocks B from sliding through the passage 52. Hence, light can be prevented from entering the driving mechanism 100 via the opening 11 to the image sensor in the electronic device.

Figure 16:
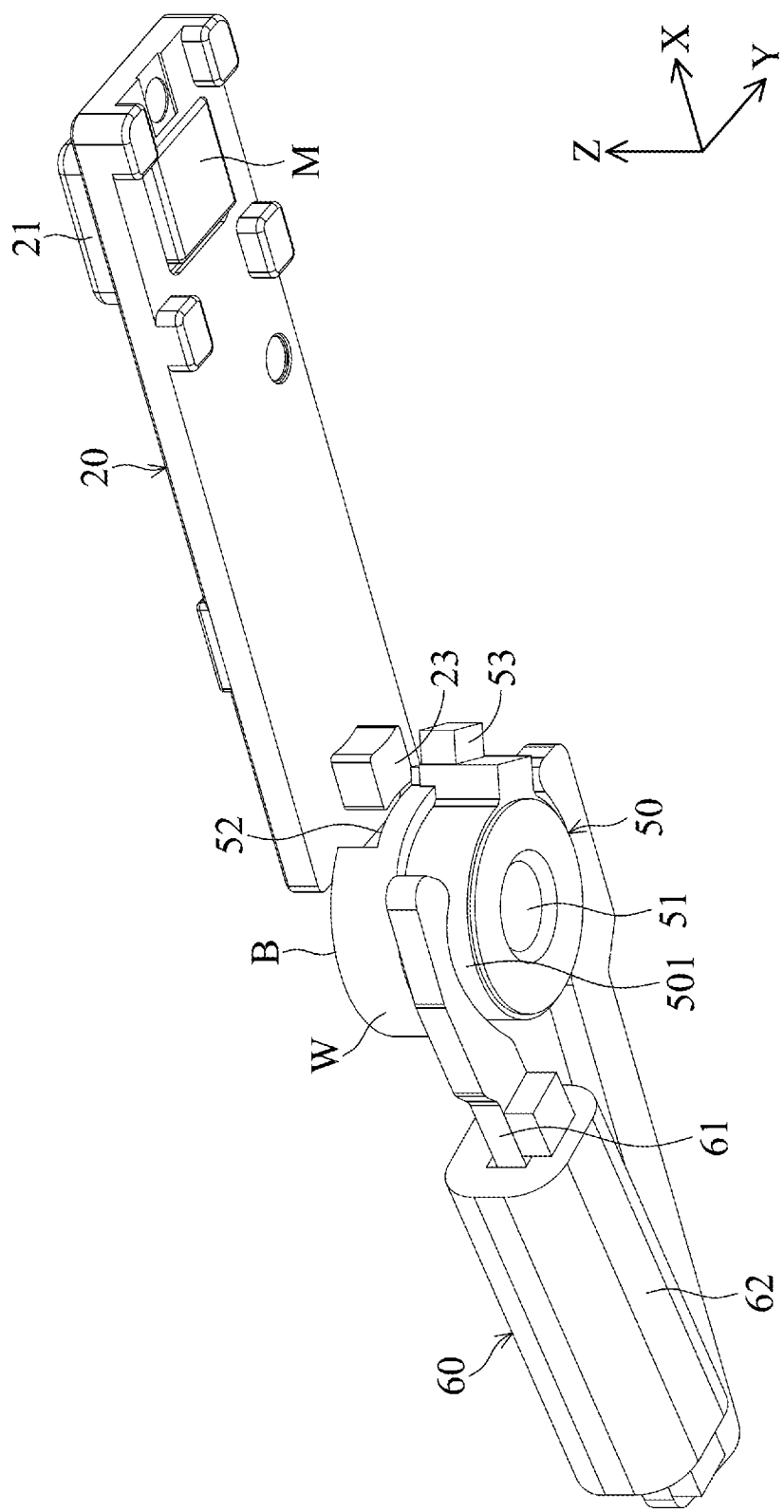
FIG. 16 is a perspective diagram showing the sliding portion 23 of the movable part 50 aligned to the passage 52 when the first driving assembly 60 generates a second magnetic field.
Figure 17:
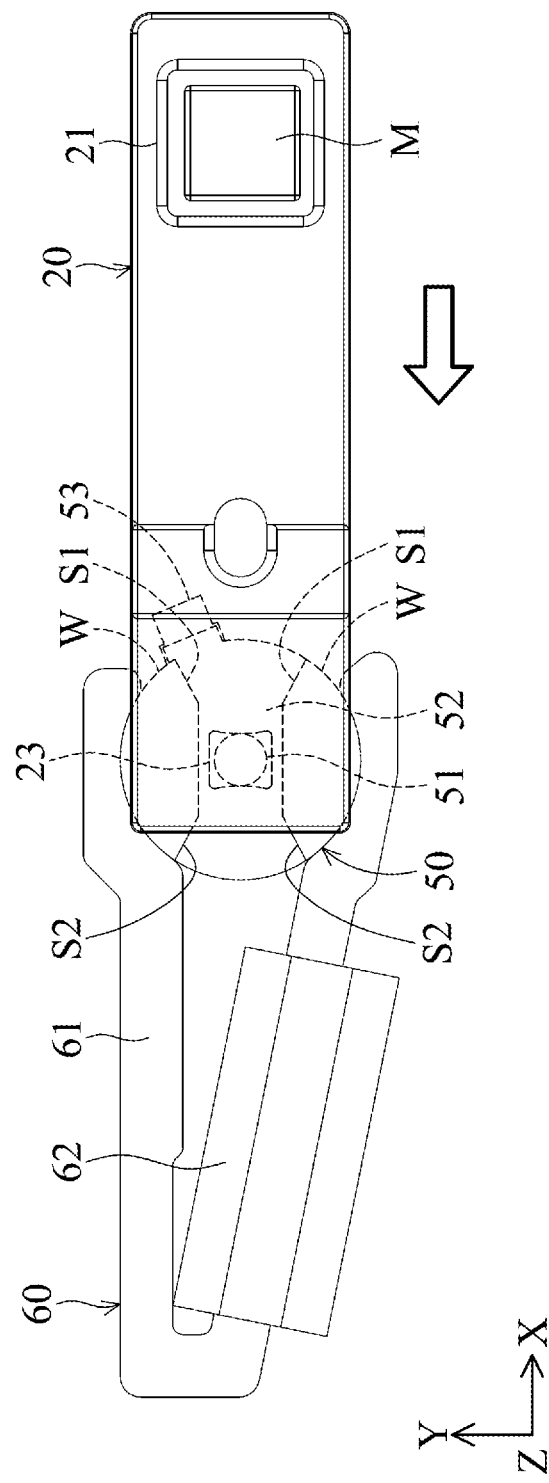
FIG. 17 is a top view of the movable unit 20, the movable part 50, and the first driving assembly 60 when the first driving assembly 60 generates a second magnetic field.
Figure 18:
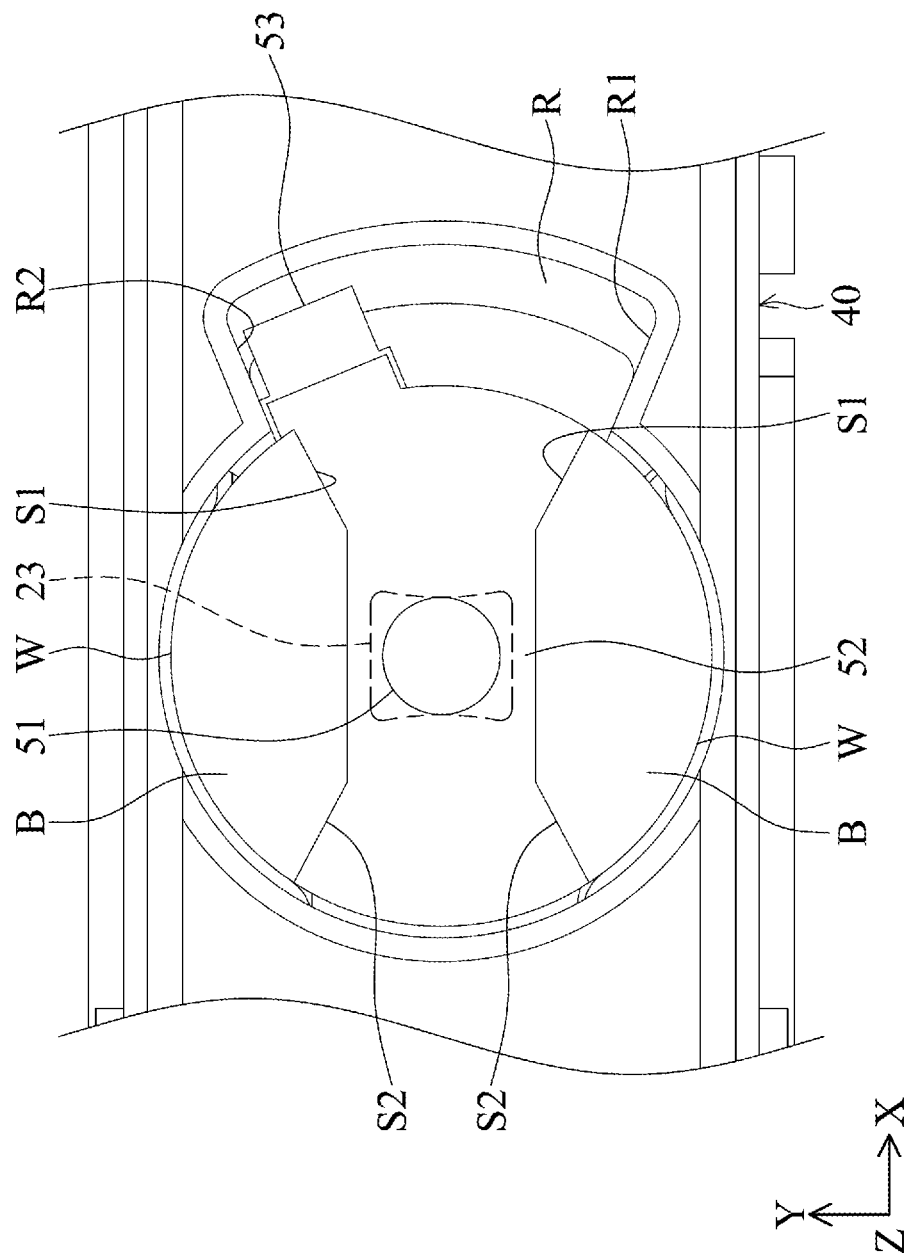
FIG. 18 is a schematic diagram showing the restricting portion 53 of the movable part 50 abutting the second sidewall R2 of the fan-shaped recess R when the first driving assembly 60 generates a second magnetic field.

FIG. 16 is a perspective diagram showing the sliding portion 23 of the movable part 50 aligned to the passage 52 when the first driving assembly 60 generates a second magnetic field. FIG. 17 is a top view of the movable unit 20, the movable part 50, and the first driving assembly 60 when the first driving assembly 60 generates a second magnetic field. FIG. 18 is a schematic diagram showing the restricting portion 53 of the movable part 50 abutting the second sidewall R2 of the fan-shaped recess R when the first driving assembly 60 generates a second magnetic field.

Referring to FIGS. 16-18, when a second current signal is applied to the coil 62, the first driving assembly 60 can generate a second magnetic field, and the movable part 50 is affected by the second magnetic field to rotate relative to the base 40, whereby the restricting portion 53 of the movable part 50 abuts a second sidewall R2 of the fan-shaped recess R. Moreover, the passage 52 between the two blocks B is parallel to a longitudinal axis (X axis) of the driving mechanism 100 and aligned to the sliding portion 23 at the bottom of the movable unit 20.

In this state, the second driving assembly 70 can be energized to produce a magnetic repulsion force between the second driving assembly 70 and the magnet M, whereby the movable unit 20 and the optical element 30 are forced to move from the initial position of FIGS. 2 and 3 along the –X direction to a limit position. Thus, light can enter the driving mechanism 100 via the opening 11 and then reach the image sensor in the electronic device.

Figure 19:
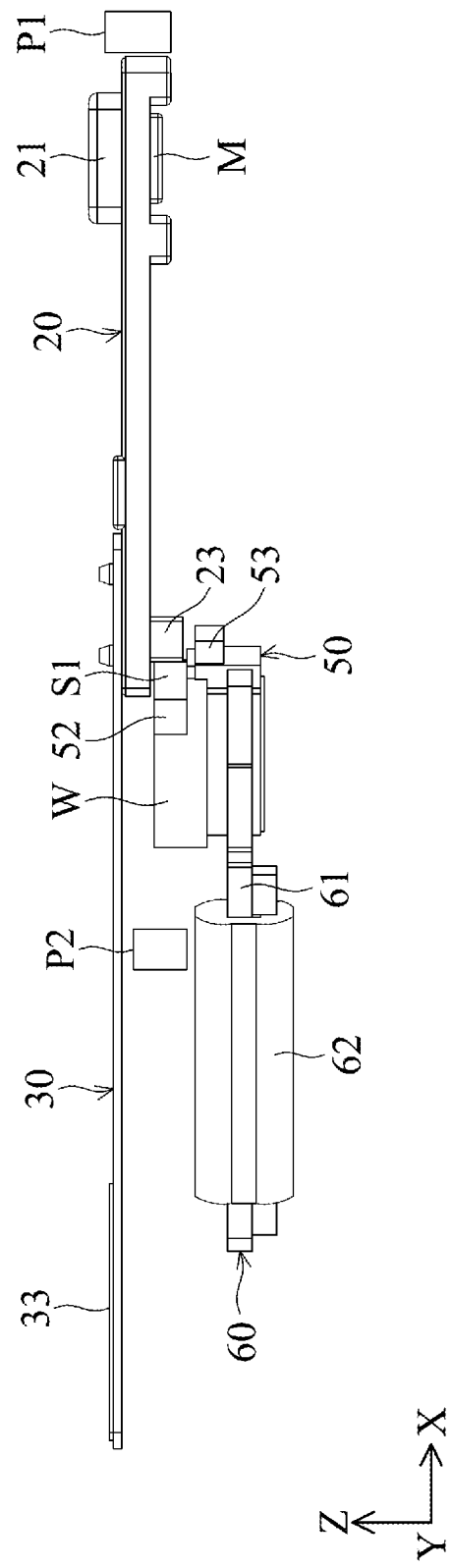
FIG. 19 is a schematic diagram shows that the movable unit 20 contacts the first buffer member P1 when in the initial position.
Figure 20:
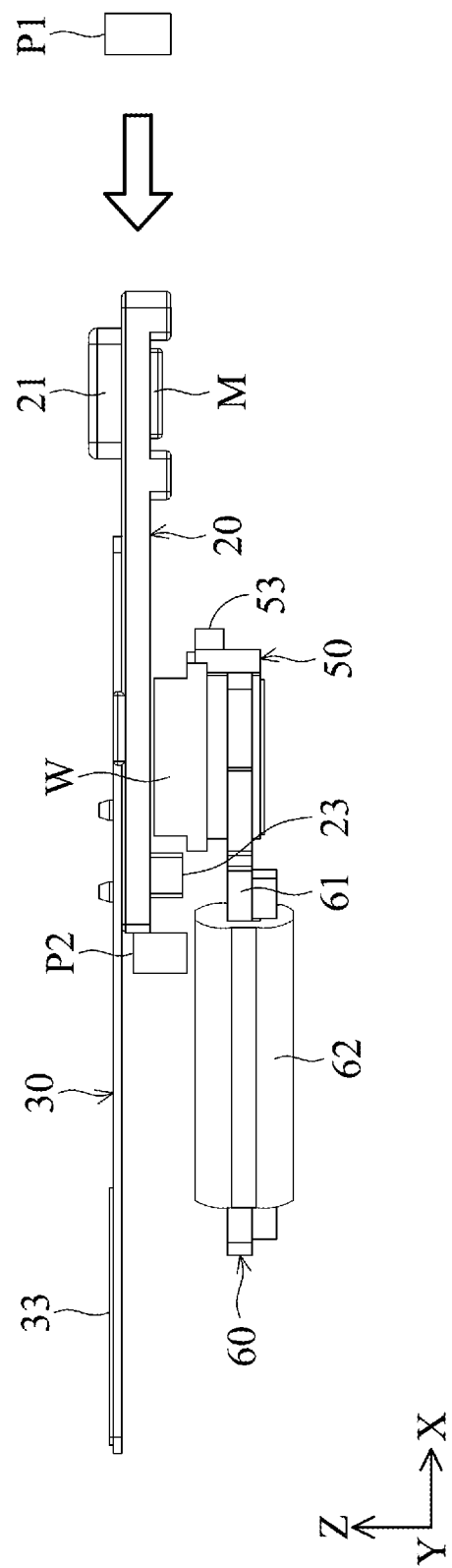
FIG. 20 is a schematic diagram shows that the movable unit 20 contacts the second buffer member P2 when in the limit position.

FIG. 19 is a schematic diagram shows that the movable unit 20 contacts the first buffer member P1 when in the initial position. FIG. 20 is a schematic diagram shows that the movable unit 20 contacts the second buffer member P2 when in the limit position.

Referring to FIG. 19, when the movable unit 20 is situated in the initial position before sliding through the passage 52 of the movable part 50, the first buffer member P1 contacts an end of the movable unit 20 to prevent the movable unit 20 from collision with the base 40 or the housing 10 when moving along the X axis.

Similarly, as the arrow indicates in FIG. 20, when the second driving assembly 70 drives the movable unit 20 and the optical element 30 to move from the initial position of FIGS. 2 and 3 along the –X direction through the passage 52 to the limit position, the second buffer member P2 contacts the other end of the movable unit 20, so as to prevent the movable unit 20 from collision with the base 40 or the housing 10 when moving along the X axis.

It can be seen in FIGS. 19 and 20 that the second buffer member P2 is lower than the first buffer member P1 in the vertical direction (Z direction). Moreover, the second buffer member P2 is located between the optical element 30 and the first driving assembly 60 in the vertical direction (Z direction).

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element, comprising:
 a base;
 a movable unit, movably disposed on the base and connected to the optical element;
 a movable part, movably disposed on the base and having a passage, a main body, and a plurality of blocks, wherein the blocks protrude from the main body, and the passage is formed between the blocks;
 a first driving assembly, configured to drive the movable part to move relative to the base; and
 a second driving assembly, configured to drive the movable unit to move relative to the base;
 wherein when the movable part is driven by the first driving assembly to move relative to the base from a first position to a second position, the movable unit is driven by the second driving assembly to move relative to the base from an initial position through the passage to a limit position.

2. The driving mechanism as claimed in claim 1, wherein the movable part comprises ferromagnetic or magnetic permeable material.

3. The driving mechanism as claimed in claim 1, wherein the movable unit has a sliding portion, and when the movable part is in the first position relative to the base, one of the block stops the sliding portion from entering the passage.

4. The driving mechanism as claimed in claim 3, wherein the movable part forms a curved outer surface, and the sliding portion forms a curved surface shaped corresponding to the curved outer surface of the movable part.

5. The driving mechanism as claimed in claim 1, wherein the base has a fan-shaped recess, and the movable part further has a restricting portion protruding from the main body in a horizontal direction, wherein when the movable part is in the first position relative to the base, the restricting portion abuts a first sidewall of the fan-shaped recess, and when the movable part is in the second position relative to the base, the restricting portion abuts a second sidewall of the fan-shaped recess.

6. The driving mechanism as claimed in claim 5, wherein each of the blocks forms a first guiding surface, and the first guiding surfaces of the blocks form a first divergent structure toward the peripheral of the movable part.

7. The driving mechanism as claimed in claim 6, wherein each of the blocks further forms a second guiding surface, and the second guiding surfaces of the blocks form a second divergent structure toward the peripheral of the movable part, wherein the first guiding surfaces are closer to the restricting portion than the second guiding surfaces.

8. A driving mechanism for moving an optical element, comprising:
 a base;
 a movable unit, movably disposed on the base and connected to the optical element;
 a first buffer member;
 a second buffer member, wherein the movable unit contacts the first buffer member when in the initial position, and the movable unit contacts the second buffer member when in the limit position;
 a movable part, movably disposed on the base and having a passage;
 a first driving assembly, configured to drive the movable part to move relative to the base; and
 a second driving assembly, configured to drive the movable unit to move relative to the base;
 wherein when the movable part is driven by the first driving assembly to move relative to the base from a first position to a second position, the movable unit is driven by the second driving assembly to move relative to the base from an initial position through the passage to a limit position.

9. The driving mechanism as claimed in claim 8, wherein the second buffer member is located between the optical element and the first driving assembly in a vertical direction.

10. The driving mechanism as claimed in claim 9, wherein the second buffer member is lower than the first buffer member in the vertical direction.

* * * * *